US009680192B2

(12) United States Patent
Sato et al.

(10) Patent No.: US 9,680,192 B2
(45) Date of Patent: Jun. 13, 2017

(54) AIR BATTERY AND AIR BATTERY STACK

(75) Inventors: Takashi Sato, Tsukuba (JP); Takitaro Yamaguchi, Ryugasaki (JP)

(73) Assignee: SUMITOMO CHEMICAL COMPANY, LIMITED, Chuo-ku, Tokyo (JP)

( * ) Notice: Subject to any disclaimer, the term of this patent is extended or adjusted under 35 U.S.C. 154(b) by 901 days.

(21) Appl. No.: 13/522,172

(22) PCT Filed: Jan. 14, 2011

(86) PCT No.: PCT/JP2011/050553
§ 371 (c)(1),
(2), (4) Date: Aug. 23, 2012

(87) PCT Pub. No.: WO2011/087089
PCT Pub. Date: Jul. 21, 2011

(65) Prior Publication Data
US 2012/0321968 A1 Dec. 20, 2012

(30) Foreign Application Priority Data
Jan. 18, 2010 (JP) .................. 2010-008118

(51) Int. Cl.
*H01M 12/02* (2006.01)
*H01M 12/06* (2006.01)
(Continued)

(52) U.S. Cl.
CPC ......... *H01M 12/08* (2013.01); *H01M 4/9016* (2013.01); *H01M 4/92* (2013.01);
(Continued)

(58) Field of Classification Search
CPC ........ H01M 12/06; H01M 12/08; H01M 2/10; H01M 4/86; H01M 4/90; H01M 4/92;
(Continued)

(56) References Cited

U.S. PATENT DOCUMENTS 4,894,295 A * 1/1990 Cheiky ................ H01M 12/06
429/175
5,328,778 A 7/1994 Woodruff et al.
(Continued)

FOREIGN PATENT DOCUMENTS

CN 101001686 A 7/2007
CN 101393993 A 3/2009
(Continued)

OTHER PUBLICATIONS

Machine Translation of: Bai et al. (CN 101567477A), Oct. 28, 2009.*
(Continued)

*Primary Examiner* — Kenneth Douyette
(74) *Attorney, Agent, or Firm* — Sughrue Mion, PLLC

(57) ABSTRACT

There is provided an air battery having a power generation body, the power generation body comprising: a laminate in which a negative electrode, a separator, a positive electrode having a catalyst layer and a positive electrode current collector, and an oxygen diffusion membrane are laminated in this order; and an electrolyte being in contact with the negative electrode, the separator and the positive electrode, wherein one of main surfaces of the oxygen diffusion membrane is arranged facing one of main surfaces of the positive electrode current collector; and at least a part of a peripheral edge part of the oxygen diffusion membrane is in contact with atmospheric air.

11 Claims, 9 Drawing Sheets

(51) Int. Cl.
*H01M 12/08* (2006.01)
*H01M 4/90* (2006.01)
*H01M 4/92* (2006.01)

(52) U.S. Cl.
CPC ......... *H01M 12/06* (2013.01); *H01M 12/065* (2013.01); *Y02E 60/128* (2013.01)

(58) Field of Classification Search
CPC ............ H01M 8/02; H01M 8/10; H01M 8/22; H01M 8/24
See application file for complete search history.

(56) References Cited

U.S. PATENT DOCUMENTS

| | | | |
|---|---|---|---|
| 5,707,499 A | 1/1998 | Joshi et al. | |
| 5,712,062 A | 1/1998 | Yamana et al. | |
| 5,888,666 A | 3/1999 | Kawakami | |
| 6,232,007 B1 * | 5/2001 | Payne ..................... | H01M 2/14 29/623.1 |
| 2004/0137310 A1 * | 7/2004 | Kiros ............................. | 429/42 |
| 2007/0117007 A1 * | 5/2007 | Visco .................. | H01M 2/1646 429/144 |
| 2009/0202876 A1 | 8/2009 | Shimamura et al. | |
| 2010/0323249 A1 | 12/2010 | Fujiwara et al. | |

FOREIGN PATENT DOCUMENTS

| | | |
|---|---|---|
| CN | 101567477 A | 10/2009 |
| JP | 47-035831 U | 11/1972 |
| JP | 58-43773 U | 3/1983 |
| JP | 6-256008 A | 9/1994 |
| JP | 7-85899 A | 3/1995 |
| JP | 7-505009 A | 6/1995 |
| JP | 9-298066 A | 11/1997 |
| JP | 2000-3713 A | 1/2000 |
| JP | 2002-501287 A | 1/2002 |
| JP | 2002-177747 A | 6/2002 |
| JP | 2002-343452 A | 11/2002 |
| JP | 2006-142275 A | 6/2006 |
| JP | 2008-091248 A | 4/2008 |
| JP | 2009-93983 A | 4/2009 |
| WO | 2009/104570 A1 | 8/2009 |

OTHER PUBLICATIONS

Communication from Chinese Patent Office issued Nov. 15, 2014 in counterpart Chinese Patent Application No. 201180006267.6
Communication from the Japanese Patent Office issued Nov. 11, 2014 in a counterpart Japanese Application No. 2010-008118.
Office Action issued in counterpart Japanese Patent Application No. 2010-008118 on Mar. 25, 2014.
First Office Action issued Apr. 1, 2014 in counterpart Chinese Patent Application No. 201180006267.6.
International Preliminary Report on Patentability and Written Opinion issued on Aug. 16, 2012 in International Application No. PCT/JP2011/050553.

* cited by examiner ary Applications No. PCT/JP2011/050553 filed Jan. 14, 2011, claiming priority based on Japanese Patent Application No. 2010-008118 filed Jan. 18, 2010, the contents of all of which are incorporated herein by reference in their entirety.# AIR BATTERY AND AIR BATTERY STACK

CROSS REFERENCE TO RELATED APPLICATIONS

This application is a National Stage of International Application No. PCT/JP2011/050553 filed Jan. 14, 2011, claiming priority based on Japanese Patent Application No. 2010-008118 filed Jan. 18, 2010, the contents of all of which are incorporated herein by reference in their entirety.

TECHNICAL FIELD

The present invention relates to an air battery and an air battery stack.

BACKGROUND ART

Since air batteries using atmospheric oxygen as an active material allow high energy densification, these applications to various usages such as electric cars have been expected. In order to achieve further applications, the enlargement of the capacity has been demanded. For example, in Patent Literature 1, proposed is an air secondary battery in which a first cell and a second cell are arranged through an oxygen permeation part, and the first cell and the second cell alternately carry out charge and discharge.

CITATION LIST

Patent Literature

Patent Literature 1: JP2008-91248A

SUMMARY OF INVENTION

Technical Problem

In the air secondary battery proposed above, since while one cell carries out charge the other cell carries out discharge, a cell contributing to discharge is always a cell of one side of an apparatus, so the capacity obtained to the size of the apparatus can hardly be made large. The apparatus becomes large-sized, and use thereof in broad applications is difficult.

The present invention has been achieved in consideration of such a conventional problem, and has an object to provide an air battery, an air battery stack and a wound-type battery, in which the capacity can easily be made large.

Solution to Problem

The present invention provides an air battery having a power generation body, the power generation body comprising: a laminate in which a negative electrode, a separator, a positive electrode having a catalyst layer and a positive electrode current collector, and an oxygen diffusion membrane are laminated in this order; and an electrolyte being in contact with the negative electrode, the separator and the positive electrode, wherein one of main surfaces of the oxygen diffusion membrane is arranged facing one of main surfaces of the positive electrode current collector, and at least a part of a peripheral edge part of the oxygen diffusion membrane is in contact with atmospheric air.

In the air battery of the present invention, with such an arrangement that at least a part of the peripheral edge part of the oxygen diffusion membrane is in contact with air, while discharging, air arriving at the positive electrode from at least the part of the peripheral edge part of the oxygen diffusion membrane through the oxygen diffusion membrane contributes to the discharge. While charging as an air secondary battery, air generated at the positive electrode is released outward from at least the part of the peripheral edge part of the oxygen diffusion membrane through the oxygen diffusion membrane. Then, since the air battery of the present invention has a structure different from a structure of conventional air batteries which takes in air from the main surface side of a positive electrode and an oxygen diffusion membrane, laminating by superposing the main surfaces is possible. Thereby, making the capacity large can easily be achieved.

In the air battery of the present invention, it is preferable that the power generation body have a solution comprising the electrolyte and a solvent, and the contact angle of the solvent against the surface of the oxygen diffusion membrane be 90° or more. Thereby, pores in the oxygen diffusion membrane through which oxygen diffuses hardly become wet with the solvent, and clogging of the pores can be suppressed.

In the air battery of the present invention, it is preferable that the power generation body have a solution comprising the electrolyte and a solvent, and the contact angle of the solvent against the surface of the oxygen diffusion membrane be 150° or more. Thereby, the pores in the oxygen diffusion membrane more hardly become wet with the solvent, and the clogging of the pores can be suppressed more.

The power generation body more preferably has a solution comprising the electrolyte, a solvent and a gelling agent. Thereby, contact of the liquid solvent with the pores of the oxygen diffusion membrane can be suppressed. Then, the pores hardly become wet with the solvent, and the clogging of the pores can be suppressed much more.

In the air battery of the present invention, the negative electrode has a negative electrode active material, and the negative electrode active material is preferably one or more elements selected from the group consisting of hydrogen, lithium, sodium, magnesium, aluminum, potassium, calcium, iron and zinc. When the negative electrode active material is a material of these, the air battery easily exhibits a sufficient discharge capacity.

In the air battery of the present invention, the negative electrode active material is more preferably hydrogen, lithium, aluminum, potassium, iron or zinc. When the negative electrode active material is a material of these, the air battery more easily exhibits a larger discharge capacity.

In the air battery of the present invention, the catalyst layer preferably comprises manganese dioxide or platinum. Thereby, a large discharge capacity can be obtained from the air battery. Particularly, since platinum has the occlusion/release capability of oxygen, the air battery can easily be used as an air secondary battery.

In the air battery of the present invention, the catalyst layer comprises a perovskite-type mixed oxide represented by $ABO_3$ wherein the A site comprises at least two atoms selected from the group consisting of La, Sr and Ca, and the B site comprises at least one atom selected from the group consisting of Mn, Fe, Cr and Co. In the case where the catalyst layer comprises a perovskite-type mixed oxide represented by $ABO_3$, since the mixed oxide has the occlusion/release capability of oxygen, the air battery can easily be used as a secondary battery.

The air battery of the present invention preferably further has a positive electrode for charge. Thereby, the catalyst layer of the positive electrode described above acts as a catalyst layer dedicated to discharge; and even in the case of using an easily oxidizable material such as carbon as the catalyst layer of the positive electrode, the catalyst layer can be prevented from being oxidized by oxygen generated at the positive electrode while charging, so the air battery can easily be utilized as a secondary battery.

In the air battery of the present invention, the positive electrode for charge is preferably a metal mesh. Thereby, oxygen generated at the surface of the positive electrode for charge while charging passes through a network of the mesh and is easily exhausted outside the battery cell.

The air battery of the present invention is preferably an air secondary battery. The air secondary battery is a secondary battery having a large capacity, and can be used not only in applications as small-sized batteries for electric and electronic devices, but also in applications as power sources for driving (running) electric cars.

In the air battery of the present invention, it is preferable that a second positive electrode having a second catalyst layer and a second positive electrode current collector, a second separator, and a second negative electrode be further arranged in this order on the opposite side of the oxygen diffusion membrane to the side thereof facing the positive electrode. Thereby, it is possible to obtain an air battery having a larger capacity.

The present invention provides an air battery stack having two or more of the air batteries, wherein the two or more of the air batteries are mutually laminated in a lamination direction of the laminates. According to the present invention, it is possible to obtain an air battery having a large capacity.

In the air battery of the present invention, it is preferable that the laminate form a sheet shape, and be wound. In the air battery, despite of being wound, incoming/outgoing of oxygen is easy, and it is possible to easily obtain an air battery having a larger capacity.

Advantageous Effects of Invention

According to the present invention, an air battery having a large capacity can be obtained.

DESCRIPTION OF EMBODIMENTS

Figure 1:
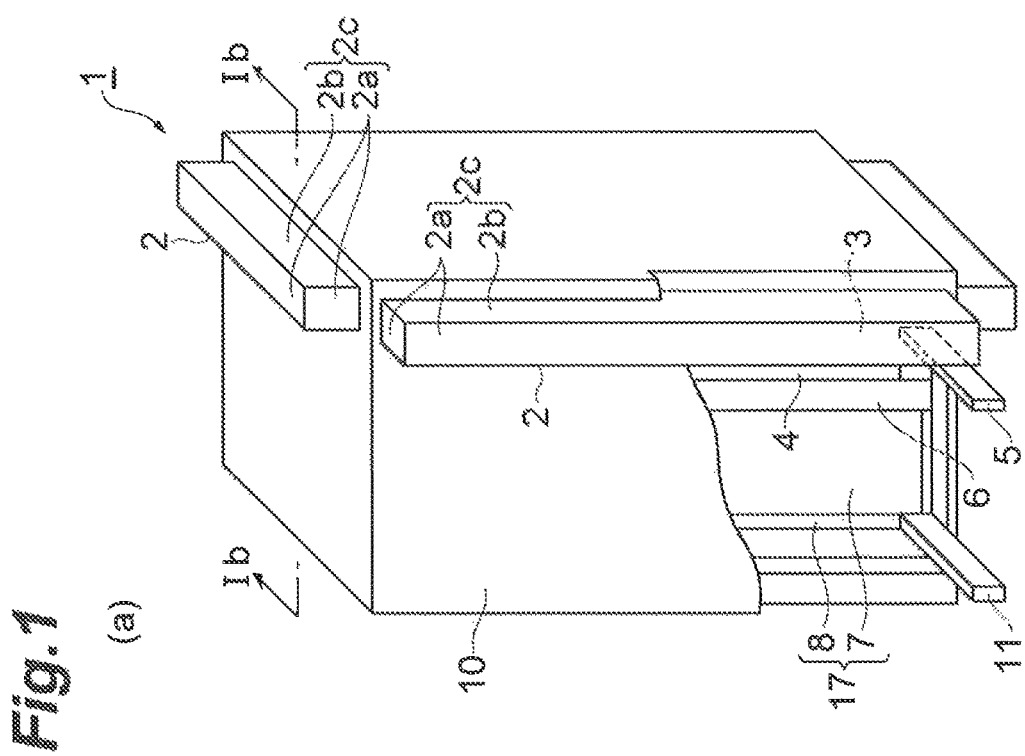
FIG. 1(a) is a schematic diagram illustrating one example of a preferred embodiment of the air battery according to the present invention.
FIG. 1(b) is a schematic cross-sectional diagram when taken along a line Ib-Ib of FIG. 1(a).
Figure 1:
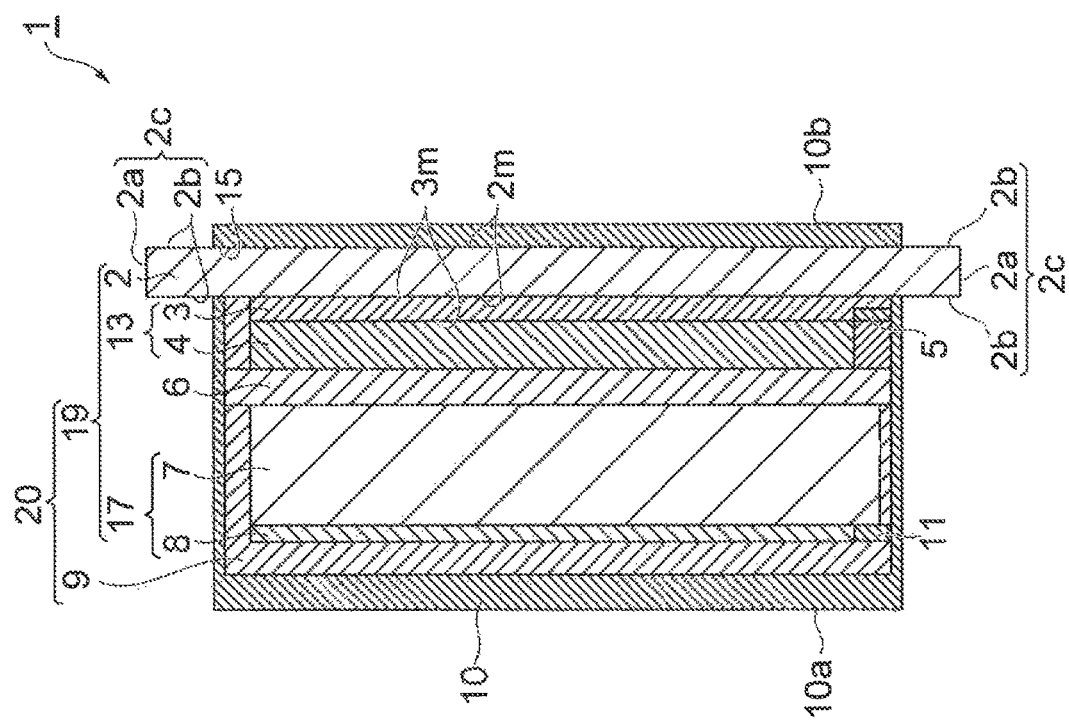

Hereinafter, preferred embodiments of the air battery according to the present invention will be described specifically with reference to the drawings. Actual dimensional ratios may differ from dimensional ratios in the drawings.

[Air Battery]

Figure 2:
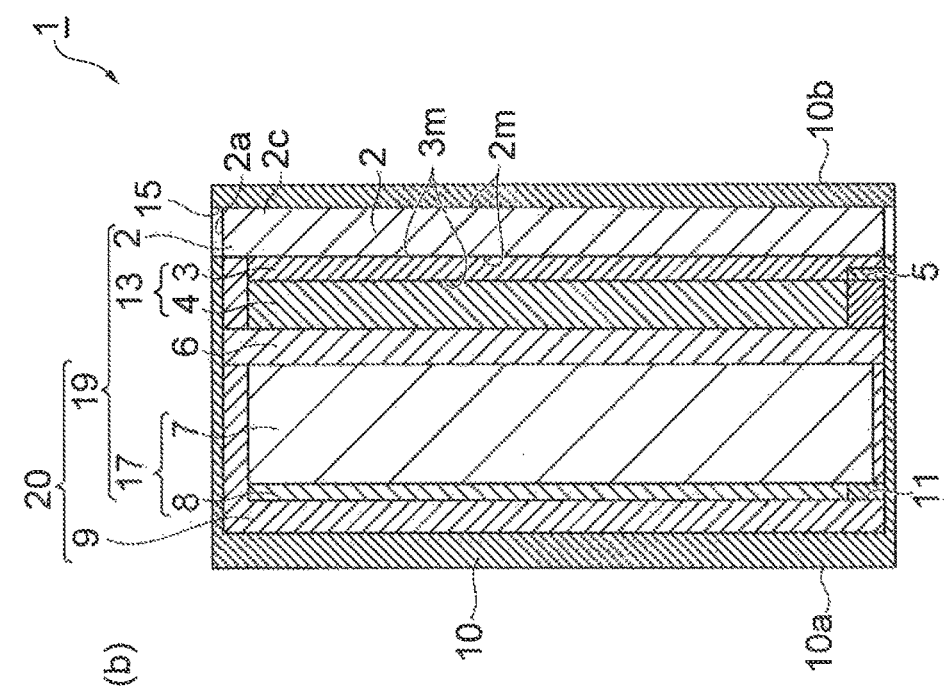
FIG. 2(a) is a schematic diagram illustrating another example of a preferred embodiment of the air battery according to the present invention.
FIG. 2(b) is a schematic cross-sectional diagram when taken along a line IIb-IIb of FIG. 2(a).
Figure 2:
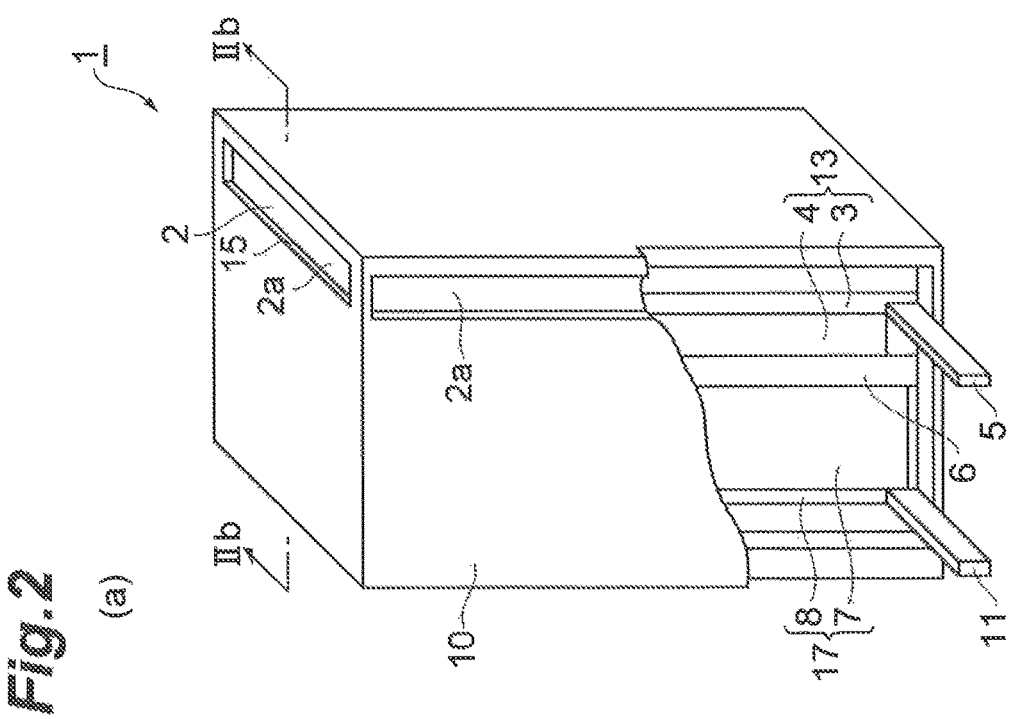

FIG. 1 is a schematic diagram (a) illustrating a preferred embodiment of the air battery according to the present invention, and a schematic cross-sectional diagram (b) when taken along the line Ib-Ib in the schematic diagram (a). FIG. 2 is a schematic diagram (a) illustrating a preferred embodiment of the air battery according to the present invention, and a schematic cross-sectional diagram (b) when taken along the line IIb-IIb in the schematic diagram (a).

As illustrated in FIGS. 1 and 2, an air battery 1 according to the present embodiment has a power generation body 20 comprising: a laminate 19 in which a negative electrode 17, a separator 6, a positive electrode 13 and an oxygen diffusion membrane 2 are arranged in this order; and an electrolyte 9. The power generation body 20 is accommodated in a container 10.

(Negative Electrode)

The negative electrode 17 has a negative electrode current collector 8, and a negative electrode active material 7 formed on the negative electrode current collector 8, and an external connection terminal (lead) 11 is connected to an end part of the negative electrode current collector 8.

It is sufficient that the negative electrode current collector 8 be a conductive material, and examples thereof include one or more metals selected from the group consisting of nickel, chromium, iron and titanium, and alloys comprising the metals, and preferably include nickel or stainless steel. Examples of the shape include plate, mesh, porous plate and metal sponge ones.

The negative electrode active material 7 is not especially limited as long as being a negative electrode material capable of constituting an air battery. Examples of the negative electrode active material include hydrogen and metals. The metal is preferably lithium, sodium, magnesium, aluminum, potassium, calcium, iron or zinc. Among them, one of hydrogen, lithium, aluminum, potassium, iron and zinc is preferable. In the case where the negative electrode active material is hydrogen, hydrogen is preferably occluded in an alloy or a metal such as a hydrogen-absorbing alloy.

(Separator)

The separator 6 is not especially limited as long as being an insulating material allowing movement of an electrolyte, and as the separator 6, for example, it is possible to use nonwoven fabrics and porous membranes made of resins such as polyolefin and fluororesins. Examples of the resin specifically include polyethylene, polypropylene, polytetrafluoroethylene and polyvinylidene fluoride. In the case where an electrolyte is dissolved in an aqueous solvent (hereinafter, a solution in which an electrolyte is dissolved in a solvent is referred to as "electrolyte solution" in some cases), examples of the resin include hydrophilicized polyethylene, polypropylene, polytetrafluoroethylene and polyvinylidene fluoride.

(Positive Electrode)

The positive electrode 13 has a positive electrode current collector 3, and a positive electrode catalyst layer 4 formed on the positive electrode current collector 3, and an external connection terminal (lead) 5 is connected to an end part of the positive electrode current collector 3.

It is sufficient that the positive electrode current collector 3 be a conductive material, and examples thereof include a metal made of nickel, chromium, iron or titanium, or alloys thereof, and preferably include nickel or stainless steel. Examples of the shape include mesh and porous plate ones. In the case where the positive electrode current collector 3 is a mesh or a porous plate, oxygen supplied from the oxygen diffusion membrane 2 easily arrives at the positive electrode catalyst layer while discharging, and oxygen generated at a surface of an electrode for charge while charging is easily exhausted outward through the oxygen diffusion membrane 2, which case is therefore preferable.

The positive electrode catalyst layer 4 has a positive electrode catalyst, but usually preferably comprises, in addition to the positive electrode catalyst, a conductive material and a binder for adhering these to the positive electrode current collector 3.

It is sufficient that the positive electrode catalyst be a material capable of reducing oxygen, and examples thereof include carbonaceous materials such as active carbon, manganese oxides such as manganese dioxide, platinum, iridium, iridium oxides, iridium oxides comprising one or more metals selected from the group consisting of titanium, tantalum, niobium, tungsten and zirconium, and perovskite-type mixed oxides represented by $ABO_3$. The perovskite-type mixed oxides preferably comprises as the A site at least two atoms selected from the group consisting of La, Sr and Ca, and as the B site at least one atom selected from the group consisting of Mn, Fe, Cr and Co. Among them, a material which can reduce oxygen or can oxidize a reduced species of oxygen is preferable.

Manganese dioxide and platinum can provide a large discharge capacity, which are therefore preferable. Platinum and perovskite-type mixed oxides have an occlusion/release capability of oxygen, and can be used for an air secondary battery, which are therefore preferable.

The conductive material is not especially limited, but examples thereof include carbonaceous materials such as acetylene black and Ketjen Black.

It is sufficient that the binder be one not dissolving in an electrolyte solution to be used, and preferable are fluororesins including polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, polyvinylidene fluoride, polychlorotrifluoroethylene and chlorotrifluoroethylene-ethylene copolymers.

(Electrolyte)

The electrolyte is in contact with the negative electrode 17, the separator 6 and the positive electrode 13. In the case where the electrolyte 9 is dissolved in a solvent, an electrolyte solution in which the electrolyte 9 is dissolved is impregnated in the separator 6, and the laminate comprising the negative electrode 17, the separator 6 and the positive electrode 13. In the case where the electrolyte 9 is dissolved in an aqueous solvent, for example, in the case where the electrolyte 9 is comprised in an aqueous solution, the aqueous solution is preferably one in which NaOH, KOH or $NH_4Cl$ is dissolved. The concentration of NaOH, KOH or $NH_4Cl$ in the aqueous solution is preferably 1 to 99% by weight (wt %), more preferably 10 to 60 wt %, and still more preferably 20 to 40 wt %.

In the case where the electrolyte 9 is dissolved in a nonaqueous solvent, for example, in the case where the electrolyte 9 is dissolved in an organic solvent, as the organic solvent it is possible to use one solvent selected from the group consisting of cyclic carbonates, chain carbonates, cyclic esters, cyclic ethers and chain ethers, or a mixed solvent made of two or more thereof.

Examples of the cyclic carbonates include ethylene carbonate, propylene carbonate, butylene carbonate, vinylene carbonate and fluoroethylene carbonate. Examples of the chain carbonates include dimethyl carbonate, diethyl carbonate and methyl ethyl carbonate. Examples of the cyclic esters include γ-butyrolactone and γ-valerolactone. Examples of the cyclic ethers include tetrahydrofuran and 2-methyltetrahydrofuran. Examples of the chain ethers include dimethoxyethane and ethylene glycol dimethyl ether.

In the case where the electrolyte 9 is dissolved in a nonaqueous solvent, the electrolyte solution can include as an electrolyte a salt comprising an element constituting the negative electrode active material 7.

In the case where the electrolyte 9 is dissolved in a solvent, it is preferable that a gelling agent be dissolved in the solvent, and it is more preferable that a gelling agent be dissolved in an aqueous solvent. It is sufficient that the gelling agent be swellable with water, and preferable are polymers including poly(sodium acrylate), carboxymethylcellulose, poly(ethylene glycol) and poly(vinyl alcohol). Depending on the combination of a solvent and the oxygen diffusion membrane 2, the solvent permeates in pores of the oxygen diffusion membrane 2 in some cases, thereby making oxygen difficult to diffuse in the oxygen diffusion membrane 2. However, making a gelling agent dissolved makes the solvent difficult to permeate in the oxygen diffusion membrane 2, resultantly making oxygen easy to permeate through the oxygen diffusion membrane.

The electrolyte 9 may not be dissolved in a solvent. In this case, examples of the electrolyte include polyethylene glycol derivatives, alkylborane-including polymers, polysilicone derivatives (made by Momentive Performance Materials Inc.), polymers comprising sulfonic acid, β-alumina solid electrolytes, NASICON-type solid electrolytes, solid electrolytes obtained by calcining high-purity lithium sulfide and phosphorus sulfide, and lithium ion-conductive glass ceramics (LICGC)(made by Ohara Inc.).

(Oxygen Diffusion Membrane)

As illustrated in FIGS. 1(a) and (b), one of main surfaces 2m of the oxygen diffusion membrane 2, that is, one of largest-area surfaces 2m among surfaces which the oxygen diffusion membrane 2 has is arranged so as to face one of main surfaces 3m of the positive electrode current collector 3, that is, one of largest-area surfaces 3m among surfaces which the positive electrode current collector 3 has. Then, at least a part of peripheral edge parts 2c of the oxygen diffusion membrane 2, that is, peripheral edge parts 2b of the main surfaces 2m of the oxygen diffusion membrane 2 and side surfaces 2a which are surfaces excluding the main surfaces 2m thereof are in contact with atmospheric air.

In the air battery 1 illustrated in FIGS. 1(a) and (b), the peripheral edge part 2c of the oxygen diffusion membrane 2 protrudes outward through an opening 15 of the container 10, and it is possible to take atmospheric oxygen into the inside of the power generation body 20 from the peripheral edge part 2c, and release oxygen generated at the inside of the power generation body 20 outward. Although in the air battery 1 illustrated in FIG. 1, a form is illustrated in which the peripheral edge parts 2c of the oxygen diffusion membrane 2 protrude to four directions, it is sufficient that the peripheral edge part 2c protrude at least to one direction.

As in the air battery 1 illustrated in FIGS. 2(a) and (b), the peripheral edge part 2c of the oxygen diffusion membrane 2 may not expose completely outward from the opening 15 of the container 10, and the side surfaces 2a alone may be in contact with atmospheric air through the opening 15. In the air battery of FIG. 2, it is sufficient that at least one side surface 2a of four side surfaces of the oxygen diffusion membrane 2 expose from the opening 15.

The oxygen diffusion membrane 2 is a membrane having continuous pores allowing oxygen to diffuse and permeate through, and is usually called a porous membrane. The continuous pores in the oxygen diffusion membrane 2 allows the diffusion of oxygen between the surfaces being in contact with air of the peripheral edge part 2c of the oxygen diffusion membrane 2 and the main surface 2m facing the positive electrode 13 of the oxygen diffusion membrane 2.

In order for oxygen to sufficiently permeate from the peripheral edge part 2c of the oxygen diffusion membrane 2 to the main surface 2m thereof, the diameter of the pores is preferably about 0.01 μm to 2 mm, and more preferably about 1 μm to 2 mm.

In order for oxygen to sufficiently permeate from the peripheral edge part 2c of the oxygen diffusion membrane 2 to the main surface 2m thereof, the thickness thereof is preferably 1 μm to 50 mm, more preferably 5 μm to 1 mm, and especially preferably 5 μm to 100 μm.

In order for oxygen to sufficiently permeate from the peripheral edge part 2c of the oxygen diffusion membrane 2 to the main surface 2m thereof, the porosity of the oxygen diffusion membrane is preferably 1% to 95%, more preferably 10% to 90%, and especially preferably 20% to 65%. If the porosity is high, in the case where an electrolyte is dissolved in a solvent, since the solvent easily permeates in the oxygen diffusion membrane 2, oxygen supplied from the outside hardly arrives at the surface of the positive electrode current collector 3, and the discharge speed resultantly tends to decrease. If the porosity is low, since diffusion paths of air becomes few, the permeability of oxygen also deteriorates, and the discharge speed resultantly tends to decrease.

Examples of a material for the oxygen diffusion membrane 2 include polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, polyvinylidene fluoride, polychlorotrifluoroethylene and chlorotrifluoroethylene-ethylene copolymers. The porous membrane may be manufactured by a drawing method, a solvent-removal method, a filler-removal method or the like.

In the case where the electrolyte 9 is dissolved in a solvent, the contact angle of the solvent against the surface of the oxygen diffusion membrane 2 is preferably 90° or higher. When the contact angle is in the range described above, in the case where the solvent is an aqueous solvent, a water-repellent oxygen diffusion membrane can be used for the oxygen diffusion membrane 2; and in the case where the solvent is a nonaqueous solvent, an oil-repellent oxygen diffusion membrane can be used. That the oxygen diffusion membrane 2 has a property of repelling a solvent in such a manner, that is, that the oxygen diffusion membrane 2 has a property of being hardly wet with the solvent, can suppress wetting and clogging of the interior of the continuous pores of the oxygen diffusion membrane 2 with the solvent in which an electrolyte is dissolved. The contact angle means an angle (an angle inside a liquid is taken) made by an oxygen diffusion membrane and a tangential line on a surface of a liquid droplet of a solvent at a point where three phases of the liquid droplet of the solvent, the oxygen diffusion membrane and air being in contact with each other.

The contact angle of the solvent against the surface of the oxygen diffusion membrane 2 is more preferably 150° or higher. When the contact angle is in the range described above, in the case where the solvent is an aqueous solvent, the oxygen diffusion membrane 2 can be said to have a super water repellency; and in the case where the solvent is a nonaqueous solvent, the oxygen diffusion membrane 2 can be said to have a super oil repellency. That the oxygen diffusion membrane 2 has a property of remarkably repelling a solvent in such a manner, that is, that the oxygen diffusion membrane 2 has a property of being remarkably hardly wet with the solvent, can more suppress wetting and clogging of the interior of the continuous pores of the oxygen diffusion membrane 2 with the solvent in which an electrolyte is dissolved.

In the case where an electrolyte is dissolved in an aqueous solvent, it is sufficient that the oxygen diffusion membrane 2 having a water repellency have a contact angle against water of 90° or higher, and examples thereof include polyethylene, polypropylene, polyvinylidene chloride and polystyrene. It is sufficient that the oxygen diffusion membrane 2 having a super water repellency have a contact angle against water of 150° or higher, and examples thereof include UC Fiber (made by Ube Nitto Kasei Co., Ltd.) and nonwoven fabrics coated with a fluororesin or the like.

From the viewpoint of enhancing the capacity maintenance rate of the air battery, the oxygen diffusion membrane preferably has a water repellency, and more preferably has a super water repellency.

In the case where an electrolyte is dissolved in a nonaqueous solvent, it is sufficient that the oxygen diffusion membrane 2 having an oil repellency have a contact angle against an organic solvent of 90° or higher, and examples thereof include nonwoven fabrics made of fluororesins such as polytetrafluoroethylene (PTFE), tetrafluoroethylene-perfluoroalkyl vinyl ether copolymers, tetrafluoroethylene-hexafluoropropylene copolymers, tetrafluoroethylene-ethylene copolymers, polyvinylidene fluoride, polychlorotrifluoroethylene and chlorotrifluoroethylene-ethylene copolymers. It is sufficient that the oxygen diffusion membrane 2 having a super oil repellency have a contact angle against an organic solvent of 150° or higher, and examples thereof includes UC Fiber made by Ube Nitto Kasei Co., Ltd., and nonwoven fabrics coated with a fluororesin or the like. From the viewpoint of enhancing the capacity maintenance rate of the air battery, the oxygen diffusion membrane preferably has an oil repellency, and more preferably has a super oil repellency.

A surface treatment also can develop the above-mentioned water and oil repellency. For example, nonwoven fabrics coated with a fluororesin or the like can be used.

The shape and size of the oxygen diffusion membrane 2 are not especially limited, and can suitably be varied for use according to the shape and size of the battery cell and particularly the shape and size of the positive electrode. From the viewpoint of the discharge speed, for example, it is preferable that the area of the main surface 2m of the oxygen diffusion membrane 2 be larger than the area of the main surface 3m of the positive electrode current collector 3.

In this case, it is easy that a peripheral edge part of the oxygen diffusion membrane 2 is protruded and brought into contact with the atmosphere.

In the air battery 1 according to the present embodiment, it is sufficient that the oxygen diffusion membrane 2 and the positive electrode current collector 3 face each other, and for example, a membrane through which oxygen easily permeates and carbon dioxide hardly permeates, and which has an oxygen permeation selectivity may be interposed between the oxygen diffusion membrane 2 and the positive electrode current collector 3. Examples of the membrane which has an oxygen permeation selectivity include a polymer membrane of an alkyne having one or more aromatic groups. When carbon dioxide is selectively removed from the air, for example, in the case where an aqueous solution comprising the electrolyte 9 comprises $OH^-$, the neutralization reaction of carbon dioxide and $OH^-$ decreases the $OH^-$ in the aqueous solution, thereby a decrease in the charge/discharge efficiency can be suppressed. The aromatic group comprised in the alkyne polymer membrane is preferably a group selected from the group consisting of a phenyl group, a naphthyl group, an anthracenyl group, a pyrenyl group, a perylenyl group, a pyridinyl group, a pyrrolyl groups, a thiophenyl group and a furyl group, or a substituted aromatic group in which at least a part of hydrogen atoms in the group described above is substituted. When the aromatic group is one of the groups described above, the oxygen/carbon dioxide permselectivity improves more. The aromatic group is more preferably a phenyl group or a substituted phenyl group.

(Positive Electrode for Charge)

The air battery according to the present embodiment can further have a positive electrode for charge used for charging. Thereby, the positive electrode catalyst layer 4 described above acts as a catalyst layer dedicated to discharge. The place for the positive electrode for charge is not especially limited. For example, as in the air battery 1 illustrated in FIG. 3(*a*), an electrode for charge 72 can be installed on a surface of the positive electrode catalyst layer 4 of the positive electrode 13 on the side opposite to a positive electrode current collector 3 through an insulative separator 71. Further, for example, as in the air battery 1 of FIG. 3(*b*), the electrode for charge 72 may be installed on a surface of the negative electrode current collector 8 of the negative electrode 17 on the side opposite to a negative electrode active material 7 through the insulative separator 71. The separator 71 is one similar to the separator 6.

Figure 3:
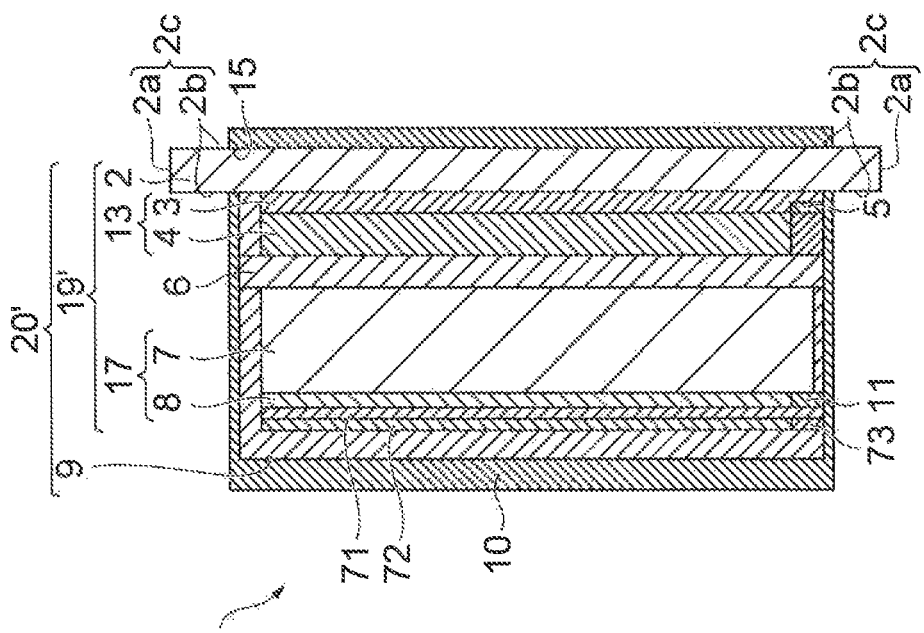
FIG. 3(a) is a typical cross-sectional diagram illustrating one example of an air battery having a positive electrode for charge.
FIG. 3(b) is a typical cross-sectional diagram illustrating another example thereof.
Figure 3:
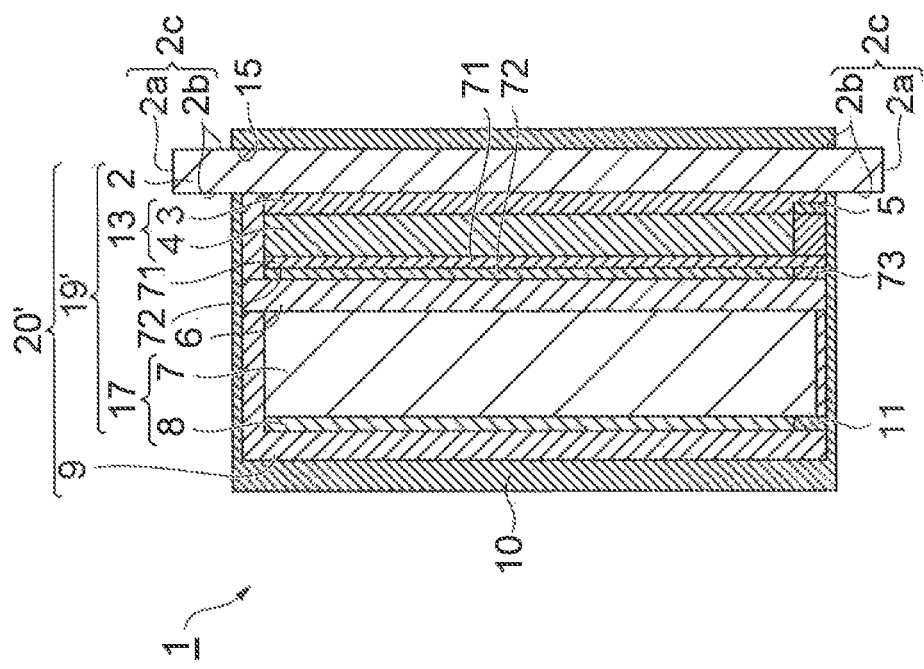

The material of the positive electrode for charge 72 is not especially limited, but is preferably a metal, and especially preferably a metal mesh or a metal porous plate. Thereby, oxygen generated on the surface of the positive electrode for charge 72 while charging is made to be easily exhausted outside the battery cell through a network of the mesh or the like. Even in the case where the positive electrode for charge 72 is arranged on the surface of the positive electrode catalyst layer 4 on the side opposite to the positive electrode current collector 3 as illustrated in FIG. 3(*a*), the positive electrode for charge 72 does not become an obstacle to movement of ions diffusing between the positive electrode catalyst layer 4 and the negative electrode active material 7. A lead terminal 73 is connected to the positive electrode for charge 72.

The action of the positive electrode for charge 72 is as follows. Since oxygen is generated at a positive electrode while charging, when the charging is carried out using the positive electrode 13 in which the positive electrode catalyst layer 4 is a material which can easily be oxidized such as a carbonaceous material, the positive electrode catalyst layer 4 is liable to be oxidized by the generated oxygen. By contrast, when the charging is carried out using the positive electrode for charge 72, it is possible to suppress the generation of oxygen at the positive electrode catalyst layer 4 while charging, and thereby it is possible to suppress the oxidation of the positive electrode current collector 3.

(Container)

The air battery preferably further has a container. The container 10 accommodates the power generation body 20 comprising the laminate 19 and the electrolyte 9, and is made of, for example, a resin such as polystyrene, polyethylene, polypropylene, polyvinyl chloride or ABS, or a metal non-reactive with the negative electrode, the positive electrode and the electrolyte solution. The peripheral edge part 2*c* of the oxygen diffusion membrane 2 described before is in contact with air through the opening 15 formed on the container 10. In the case of a battery structure comprising the positive electrode for charge, the battery structure has an oxygen exhaust port (not illustrated in figure) to exhaust oxygen generated at the positive electrode for charge while charging. In the oxygen exhaust port, a membrane or a valve through which gases can pass but an electrolyte cannot pass is preferably installed.

For example, as illustrated in FIG. 1(*b*), the container 10 is constituted of two of a container body 10*a* and a lid member 10*b*; the electrolyte 9 and the laminate 19 are disposed in the container body 10*a*; and then, the oxygen diffusion membrane 2 is arranged such that the peripheral edge parts 2*c* of the oxygen diffusion membrane 2 are exposed to the air from the opening 15 of the container 10; and the container body 10*a* and the lid 10*b* of the container may be adhered with an adhesive or the like.

[Air Battery Stack]

Then, an air battery stack will be described in which a plurality of power generation bodies 20 (air batteries 1) are mutually laminated in a lamination direction of the laminates 19.

First Embodiment

Figure 4:
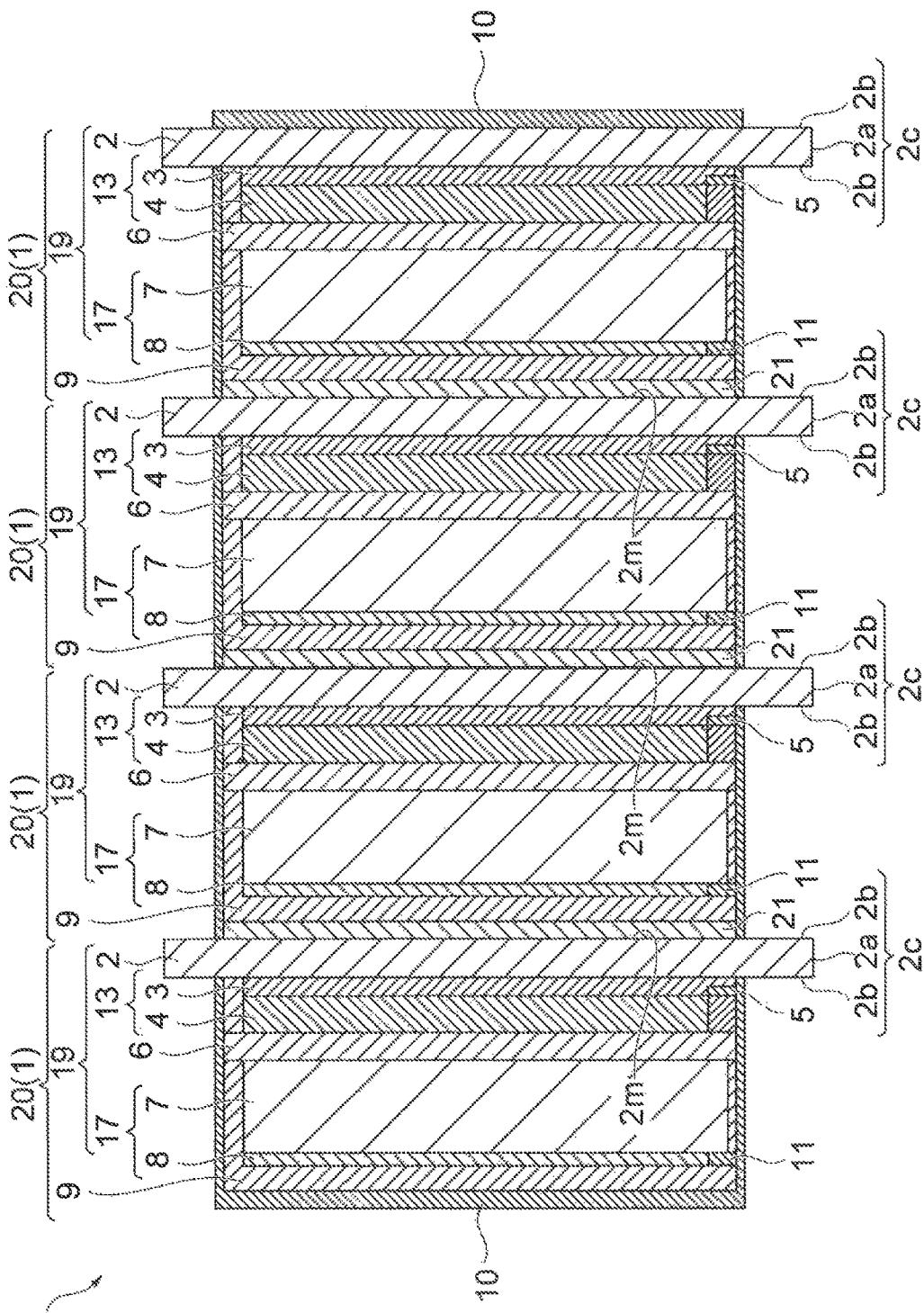
FIG. 4 is a schematic cross-sectional diagram illustrating a first embodiment of the air battery stack according to the present invention.

FIG. 4 is a schematic cross-sectional diagram illustrating a first embodiment of the air battery stack according to the present invention. In the air battery stack 40, the plurality of power generation bodies 20 are mutually laminated such that the negative electrode 17 of one power generation body 20 and the oxygen diffusion membrane 2 of another power generation body 20 face each other. In the case where the oxygen diffusion membrane 2 does not have a property of sufficiently repelling a solvent in which the electrolyte 9 is dissolved, in order to suppress a decrease in the oxygen permeability of the oxygen diffusion membrane 2 due to contact of the electrolyte 9 comprised in the one power generation body 20 with the main surface 2*m* of the oxygen diffusion membrane 2 comprised in the another power generation body 20, for example, a separator 21 such as a membrane having a property of repelling the solvent in which the electrolyte 9 is dissolved may be arranged between the electrolyte 9 comprised in the one power generation body 20 and the oxygen diffusion membrane 2 comprised in the another power generation body. In the case where the oxygen diffusion membrane 2 has a property of sufficiently repelling the solvent in which the electrolyte 9 is dissolved, the separator 21 between the electrolyte 9 comprised in the one power generation body 20 and the oxygen diffusion membrane 2 comprised in the another power generation body 20 can be eliminated as illustrated in FIG.

5. The power generation bodies 20 mutually adjacent may be arranged such that the negative electrodes 8 face each other, or such that the oxygen diffusion membranes 2 face each other. According to these battery stacks 40, it is possible to easily obtain large-capacity air battery stacks. The air battery stack 40 preferably further has the container 10 which accommodates a stack of the power generation bodies 20 and from which at least a part of the peripheral edge part of each oxygen diffusion membrane 2 is exposed to atmospheric air.

Second Embodiment

Figure 5:
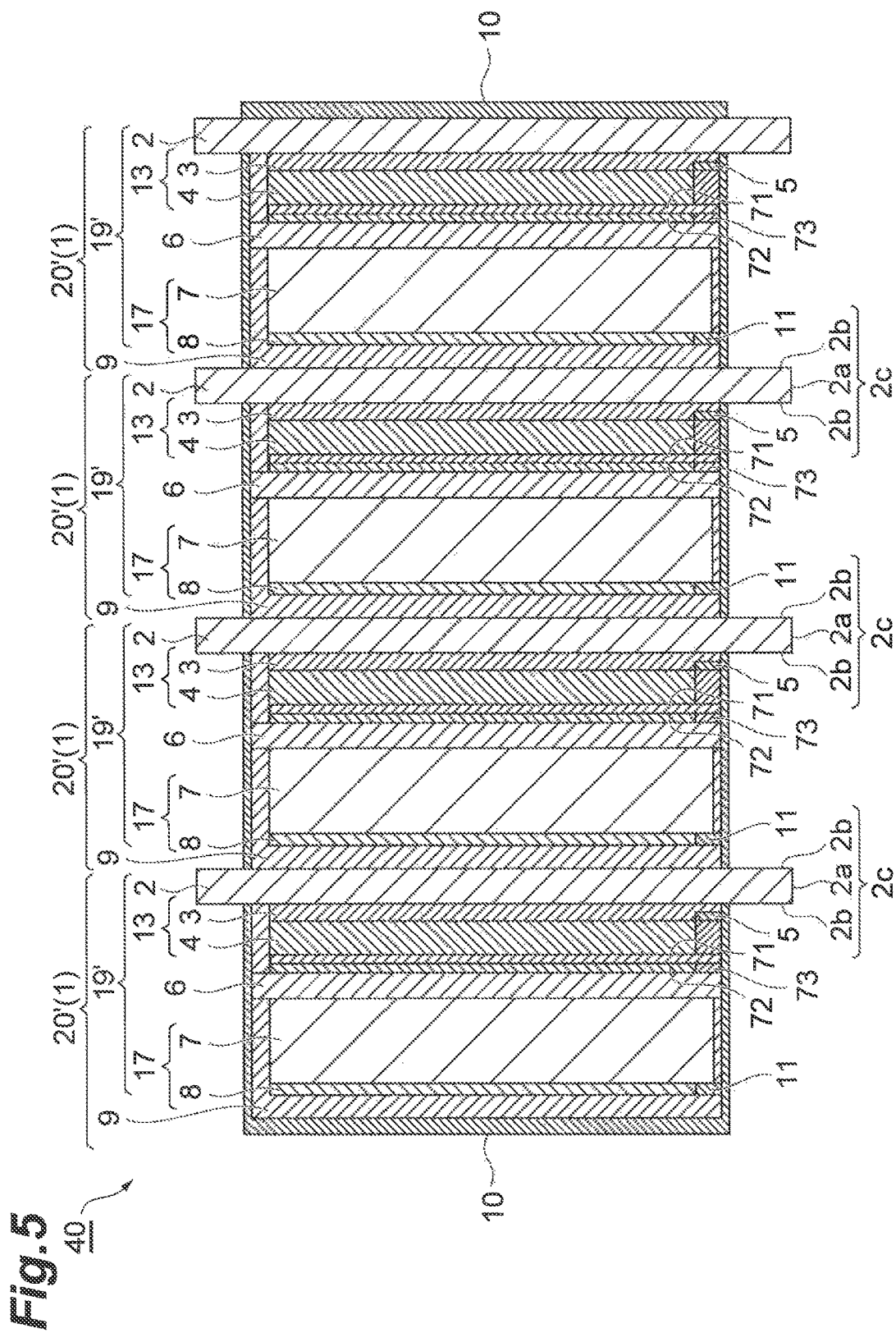
FIG. 5 is a schematic cross-sectional diagram illustrating a second embodiment of the air battery stack according to the present invention.

FIG. 5 is a schematic cross-sectional diagram illustrating a second embodiment of the air battery stack according to the present invention. The air battery stack 40 according to the present embodiment is in a form using a power generation body 20' (air battery 1) further having the electrode for charge 72 as illustrated in FIG. 3(a) as the power generation body 20 (air battery 1) of the air battery stack 40 according to the first embodiment. In the air battery stack 40 according to the present embodiment, although an electrode for charge 72 is arranged between the positive electrode 13 and the separator 6, the electrode for charge 72 may be arranged between the negative electrode 17 and the electrolyte 9 as in the power generation body 20' illustrated in FIG. 3(b), and the place thereof is not limited.

Third Embodiment

Figure 6:
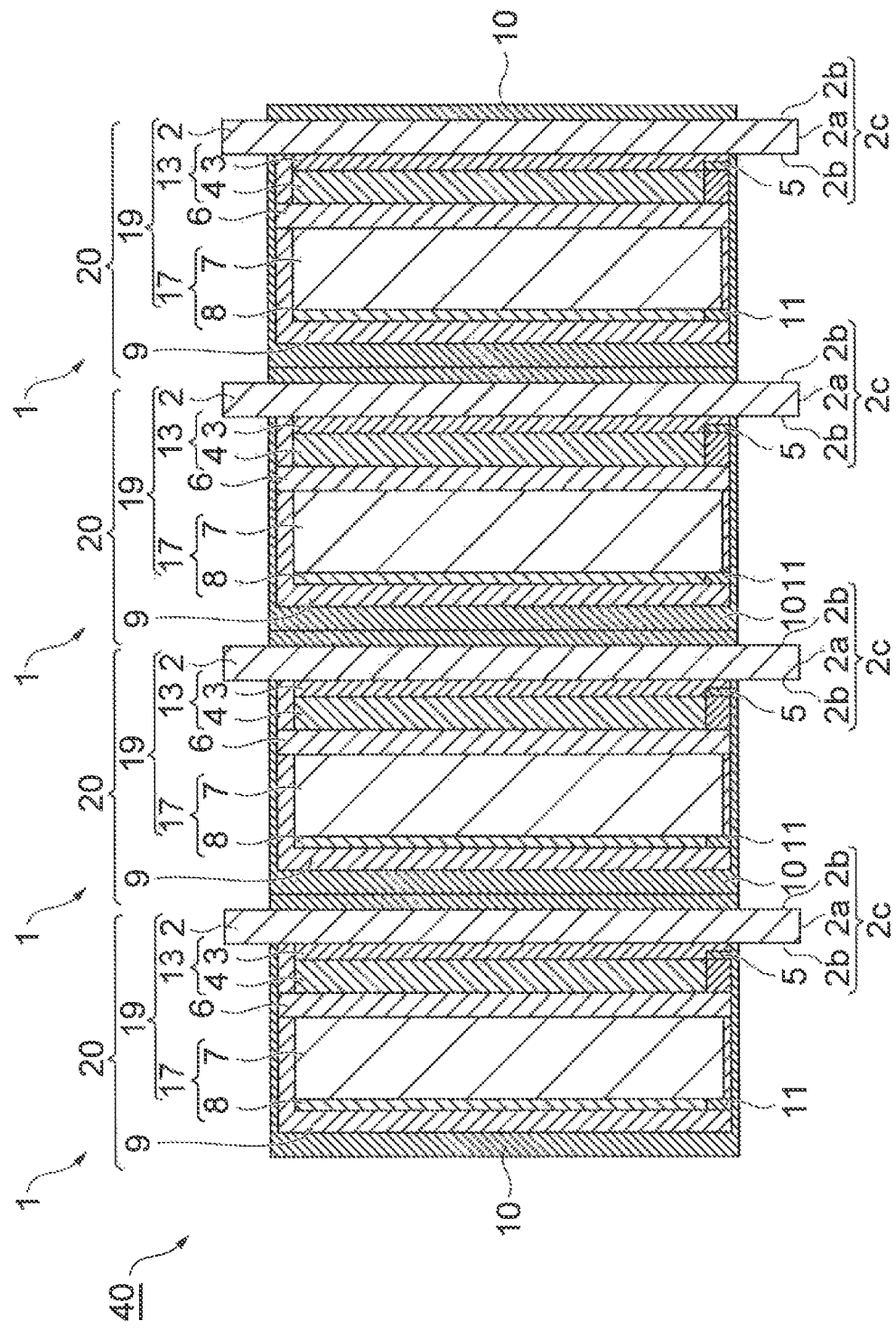
FIG. 6 is a schematic cross-sectional diagram illustrating a third embodiment of the air battery stack according to the present invention.

FIG. 6 is a schematic cross-sectional diagram illustrating a third embodiment of the air battery stack according to the present invention. The air battery stack 40 according to the present embodiment is one in which a plurality of air batteries 1 each in which the power generation body 20 is enclosed in the container 10 are laminated in the lamination direction of laminates 19. In the air battery stack 40, the plurality of air batteries 1 mutually adjacent are laminated such that the negative electrode 17 of one air battery and the oxygen diffusion membrane 2 of another air battery 1 face each other. The air batteries 1 mutually adjacent may be arranged such that the negative electrodes 17 face each other, or such that the oxygen diffusion membranes 2 face each other. According to these battery stacks 40, it is possible to easily obtain large-capacity air battery stacks.

Fourth Embodiment

Figure 7:
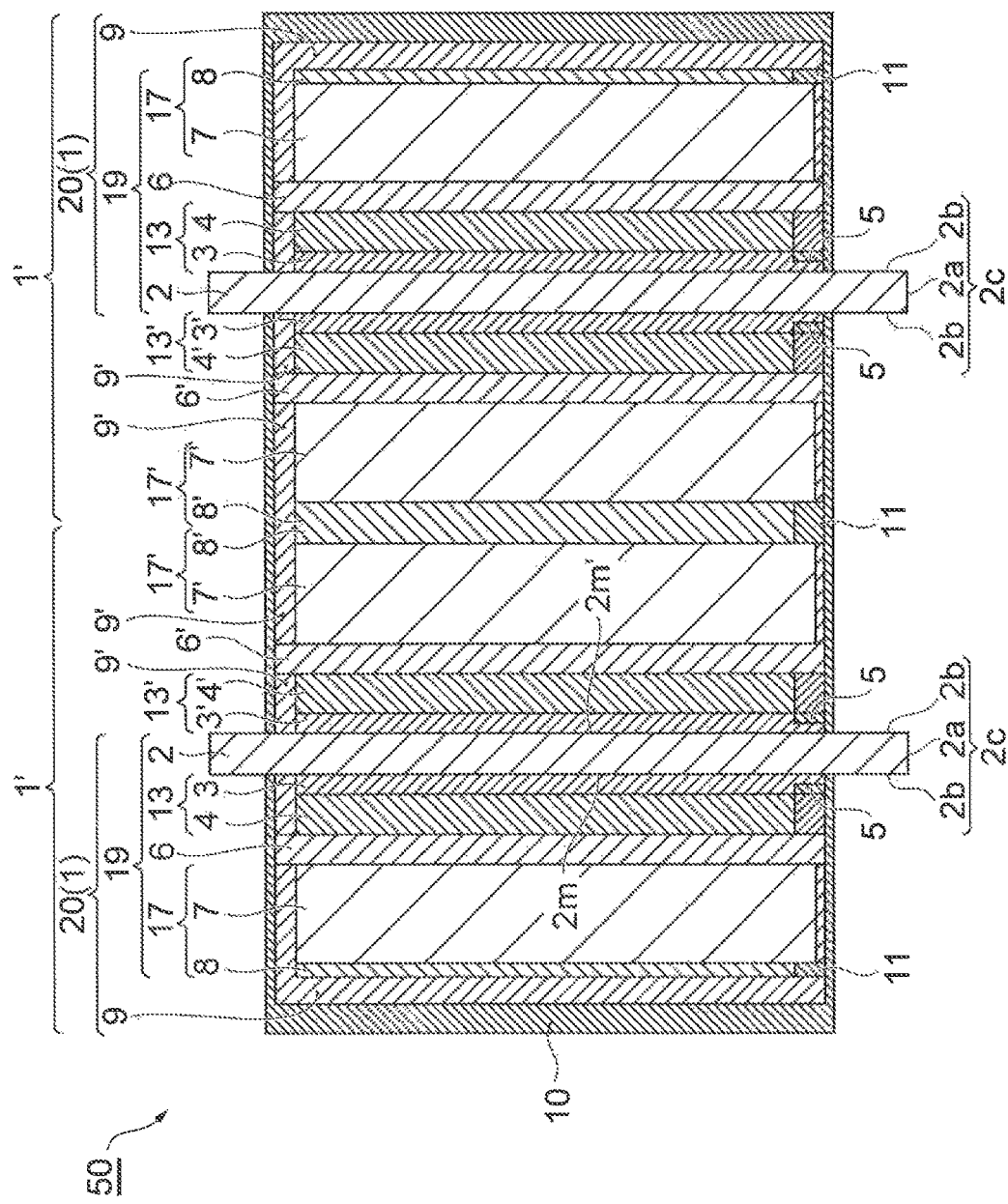
FIG. 7 is a schematic cross-sectional diagram illustrating a fourth embodiment of the air battery stack according to the present invention.

When the air batteries 1 mutually adjacent are arranged such that the oxygen diffusion membranes 2 face each other, it is also possible to commonize the oxygen diffusion membranes 2 in two adjacent cells. FIG. 7 is a schematic cross-sectional diagram illustrating such an air battery stack. The battery stack 50 according to the present embodiment is constituted of two air batteries 1'. The air battery 1' has the laminate 19 and the electrolyte 9 described before, and there are further arranged therein a second positive electrode 13' having a second catalyst layer 4' and a second positive electrode current collector 3', a second separator 6' and a second negative electrode 17' in this order on the side of the oxygen diffusion membrane 2 opposite to a positive electrode 13. The second positive electrode 13' is arranged such that the second positive electrode current collector 3' faces the oxygen diffusion membrane 2. The second positive electrode 13' having the second catalyst layer 4' and the second positive electrode current collector 3', the second separator 6' and the second negative electrode 17' are similar to the positive electrode 13 having the catalyst layer 4 and the positive electrode current collector 3, the separator 6 and the negative electrode 17, respectively, and are in contact with an electrolyte 9' similar to the electrolyte 9.

In the air battery stack 50 according to the present embodiment, since in each air battery 1', one sheet of the oxygen diffusion membrane 2 can diffuse oxygen between the main surfaces $2m$ and $2m'$ of both sides thereof and the peripheral edge part $2c$ thereof and the like, reduction of the entire thickness can be made as compared with the form of laminating the power generation bodies 20 described before, and the form of laminating the air batteries 1 each having the container described before, and space saving can be achieved in arrangement of batteries.

Also for the air battery stack according to the fourth embodiment, air batteries may be used in which the electrode for charge 72 is further provided between the positive electrode 13 and the separator 6, between the negative electrode 17 and the electrolyte 9, or in other places.

The air battery stack according to the present invention is not limited to the first to fourth embodiments described above. For example, an air battery stack may be formed by combining the air battery 1 and the air battery 1' described above.

[Wound-Type Air Battery]

Figure 8:
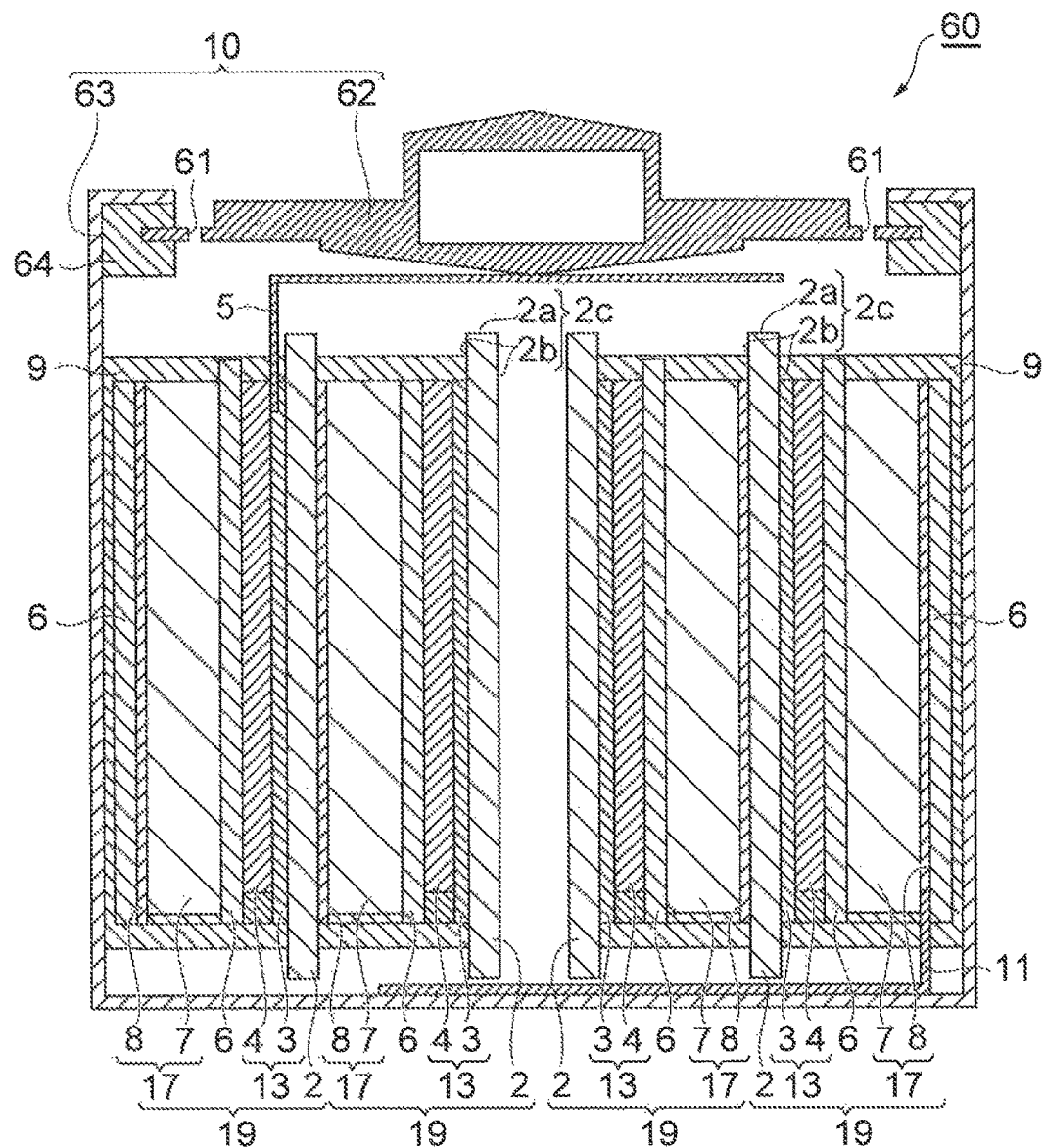
FIG. 8 is a schematic cross-sectional diagram illustrating one example of the wound-type air battery according to the present invention.

FIG. 8 is a schematic cross-sectional diagram illustrating one example of a preferred embodiment of the wound-type air battery according to the present invention. The wound-type air battery 60 according to the present embodiment is a structure in which a sheet-form laminate 19 in which a sheet-form negative electrode 17, a sheet-form separator 6, a sheet-form positive electrode 13 having a positive electrode current collector 3 with a catalyst layer 4 formed thereon, and the oxygen diffusion membrane 2 are arranged in this order is scroll-likely wound, and put with the electrolyte 9 in a container body 63, and the structure which has a lid 62 having air holes 61 for air to enter and exit through, and an insulative packing 64. The container body 63 and the lid 62 are conductive materials such as metals, and electrically connected to the external connection terminals 5 and 11.

In the present embodiment, although the peripheral edge part $2c$ of the oxygen diffusion membrane 2 is located in the container, it is not in contact with an electrolyte solution 9, but in contact with air.

Then, actions of these air batteries and air battery stacks according to the present invention will be described. In the present embodiment (for example, see FIG. 1(b)), while discharging, it is possible to take in atmospheric oxygen from the peripheral edge part $2c$ of the oxygen diffusion membrane 2 into the inside of the power generation body; and while charging in the case where they are used as a secondary battery, it is possible to release oxygen generated at the inside of a battery cell from the peripheral edge part $2c$ of the oxygen diffusion membrane 2 outward.

For example, in the case where the electrolyte 9 is dissolved in an aqueous solution, and the negative electrode active material 7 is a metal (the negative electrode active material is represented by M in the following formulae), while charging, as represented by the following formulae (1) and (2), electrons flow in from the external connection terminal 11 to the negative electrode current collector 8, and an oxide species of the negative electrode active material 7 in the electrolyte solution is reduced at the negative electrode 17. Then, at the positive electrode 13, $OH^-$ comprised in the electrolyte solution generates $O_2$, and releases electrons, thereby electrons flow out from the positive electrode current collector 3 to the external connection terminal 5. In this reaction, $O_2$ generated at the positive electrode 13 passes through the pores from the main surface of the oxygen diffusion membrane 2, and is exhausted outside the air battery 1 from the peripheral edge part 2c of the oxygen diffusion membrane 2, due to the internal pressure increase inside the battery. In the case where the positive electrode for charge 72 is used in place of the positive electrode 13, oxygen generated at the positive electrode for charge 72 is exhausted from the oxygen exhaust port (not shown in figure) as described before.

$$\text{(Positive electrode)} 2OH^- \rightarrow \tfrac{1}{2}O_2 + H_2O + 2e^- \quad (1)$$

$$\text{(Negative electrode)} MO + H_2O + 2e^- \rightarrow M + 2OH^- \quad (2)$$

On the other hand, while discharging, as represented by the following formulae (3) and (4), the negative electrode active material 7 is oxidized at the negative electrode 17; the oxide species thereof diffuses in the electrolyte solution, and electrons are released; thereby the electrons flow out from the negative electrode current collector 8 to the external connection terminal 11. Then, at the positive electrode 13, electrons flow in from the external connection terminal 5 to the positive electrode current collector 3; a reaction occurs in which $O_2$ supplied from the peripheral edge part 2c of the oxygen diffusion membrane 2 through the pores is reduced to $OH^-$.

$$\text{(Positive electrode)} \tfrac{1}{2}O_2 + H_2O + 2e^- \rightarrow 2OH^- \quad (3)$$

$$\text{(Negative electrode)} M + 2OH^- \rightarrow MO + H_2O + 2e^- \quad (4)$$

Further, for example, in the case where the electrolyte 9 is dissolved in an aqueous solution, and the negative electrode active material 7 is hydrogen, while charging, as represented by the following formulae (5) and (6), a hydrogen-absorbing alloy (M') and $H_2O$ react at the negative electrode 17 to generate a metal hydride (M'H) and $OH^-$ ions. Simultaneously, $OH^-$ ions react at the positive electrode 13 to generate $H_2O$ and oxygen gas ($O_2$).

$$\text{(Positive electrode)} 2OH^- \rightarrow H_2O + \tfrac{1}{2}O_2 + 2e^- \quad (5)$$

$$\text{(Negative electrode)} 2M' + 2H_2O + 2e^- \rightarrow 2M'H + 2OH^- \quad (6)$$

On the other hand, while discharging, as represented by the following formulae (7) and (8), oxygen gas ($O_2$) and $H_2O$ react at the positive electrode 13 to generate $OH^-$ ions. Simultaneously, $OH^-$ ions react with the metal hydride (M'H) of the negative electrode 17 to generate the metal (M') and $H_2O$.

$$\text{(Positive electrode)} 2H_2O + O_2 + 4e^- \rightarrow 4OH^- \quad (7)$$

$$\text{(Negative electrode)} 4M'H + 4OH^- \rightarrow 4M' + 4H_2O + 4e^- \quad (8)$$

Since the air battery of the present invention is not in a form of taking in air from a main surface side of a positive electrode and an oxygen diffusion membrane as in conventional air batteries, it is possible to superpose the main surfaces to make a stack. Thereby, it is possible to easily obtain a large-capacity air battery. A wound structure is also easily produced, and the intake of oxygen from the peripheral edge part and the like is easy even when wound many times, which is preferable.

[Air Battery Using a Solid Electrolyte for a Separator]

In the case where a solid electrolyte is used for the separator, the charge/discharge by the oxidation reduction reaction is not limited to those of the embodiments of the air batteries, the air battery stacks and the wound-type air battery as described above, and the charge/discharge by the following oxidation reduction reaction is also possible.

While charging, as represented by the following formulae (9) and (10), electrons flow in from the external connection terminal 11 to the negative electrode current collector 8, and cationic ions (oxide species) of the negative electrode active material 7 (in the formula, represented as M) in the electrolyte solution are reduced at the negative electrode 17. Then, at the positive electrode 13, $OH^-$ comprised in the electrolyte solution generates $O_2$ and releases electrons, thereby electrons flow out from the positive electrode current collector 3 to the external connection terminal 5. In this reaction, $O_2$ generated at the positive electrode 13 passes through the pores from the main surface of the oxygen diffusion membrane 2, and is exhausted outside the air battery 1 from the peripheral edge part 2c of the oxygen diffusion membrane 2.

$$\text{(Positive electrode)} 4OH^- \rightarrow O_2 + 2H_2O + 4e^- \quad (9)$$

$$\text{(Negative electrode)} 4M^+ + 4e^- \rightarrow 4M \quad (10)$$

While discharging, as represented by the following formulae (11) and (12), the negative electrode active material 7 (in the formula, represented as M) is oxidized at the negative electrode 17; and the cationic ions thereof (oxide species) diffuse in the electrolyte solution, and electrons are released, and thereby electrons flow out from the negative electrode current collector 8 to the external connection terminal 11. Then, electrons flow in from the external connection terminal 5 to the positive electrode current collector 3 at the positive electrode 13; and a reaction occurs in which $O_2$ supplied from the peripheral edge part 2c of the oxygen diffusion membrane 2 through the pores is reduced to $OH^-$.

$$\text{(Positive electrode)} O_2 + 2H_2O + 4e^- \rightarrow 4OH^- \quad (11)$$

$$\text{(Negative electrode)} 4M \rightarrow 4M^+ + 4e^- \quad (12)$$

Here, the above formulae (9) to (12) are formulae on assumption of the case where the valence of the cationic ions is monovalent.

Use of a solid electrolyte for the separator allows simultaneous use of an aqueous electrolyte solution in which the electrolyte is dissolved in an aqueous solution and a nonaqueous electrolyte solution in which the electrolyte is dissolved in a nonaqueous solution. For example, in the case where a lithium metal is used for the negative electrode, it is possible to use a nonaqueous electrolyte solution for the negative electrode side and an aqueous electrolyte solution for the positive electrode side, whereby it is possible to prevent contact of the lithium metal and moisture, and to prevent the deposition of $Li_2O$ generated in the case of using a nonaqueous electrolyte solution alone, thus it is possible to use it as a large-capacity battery.

The air battery 1 using a solid electrolyte as the separator 6 can use as the power generation body 20 the laminate 19 in which a nonaqueous electrolyte solution is disposed between the negative electrode 17 and the solid electrolyte, and an aqueous electrolyte solution is disposed between the positive electrode 13 and the solid electrolyte, in place of the electrolyte 9. Then, the power generation body 20 is accommodated in the container 10. Hereinafter, the constituting elements of the power generation bodies 20 and 20' will be described. However, in an air battery using a solid electrolyte as a separator, for the negative electrode current collector 8, the positive electrode current collector 4, the positive electrode catalyst layer 3 and the oxygen diffusion membrane 2 the same materials as described before are usable, so the description will be omitted.

The negative electrode active material 7 is not especially limited as long as being a negative electrode material capable of constituting an air battery. Examples of the negative electrode active material include hydrogen and metals. The metal is preferably lithium, sodium, magnesium or calcium. Among them, one of lithium, sodium and calcium is preferable.

(Separator)

The separator 6 is not especially limited as long as being an insulating material allowing only the movement of cationic ions, and for examples, it is possible to use polyethylene glycol derivatives, alkylborane-including polymers, polysilicone derivatives (made by Momentive Performance Materials Inc.), polymers comprising sulfonic acid, β-alumina solid electrolytes, NASICON-type solid electrolytes, solid electrolytes obtained by calcining high-purity lithium sulfide and phosphorus sulfide or lithium ion-conductive glass ceramics (LICGC)(made by Ohara Inc.).

(Electrolyte)

The electrolyte solution of the positive electrode side being in contact with the separator 6 and the positive electrode 13 is preferably an aqueous solution in which NaOH, KOH or $NH_4Cl$ is dissolved. The concentration of NaOH, KOH or $NH_4Cl$ in the aqueous solution is preferably 1 to 99% by weight (wt %), more preferably 10 to 60 wt %, and still more preferably 20 to 40 wt %.

For the electrolyte solution of the negative electrode side being in contact with the separator 6 and the negative electrode 17, it is possible to use one solvent selected from the group consisting of cyclic carbonates, chain carbonates, cyclic esters, cyclic ethers and chain ethers, or a mixed solvent made of two or more thereof.

The electrolyte solution of the negative electrode side can include a salt comprising an element constituting the negative electrode active material 7 as the electrolyte.

The electrolyte solution of the positive electrode side preferably comprises a gelling agent, and particularly in the case where the solvent is an aqueous solvent, more preferably comprises a gelling agent. It is sufficient that the gelling agent be swellable with water, and preferable are polymers including poly(sodium acrylate), carboxymethylcellulose, poly(ethylene glycol) and poly(vinyl alcohol). Depending on the combination of a solvent and the oxygen diffusion membrane 2, the solvent permeates in the pores of the oxygen diffusion membrane 2 in some cases, thereby making oxygen difficult to diffuse in the oxygen diffusion membrane 2. However, an electrolyte solution comprising a gelling agent hardly permeates in the oxygen diffusion membrane 2, resultantly making oxygen easy to permeate through the oxygen diffusion membrane 2.

A form using a solid electrolyte for the negative electrode side is also possible. In this case, for example, it is preferable to use a metal lithium for the negative electrode active material 7, and cause a lithium ion-permeable solid electrolyte to be pressure bonded on the negative electrode active material 7. Examples of the lithium ion-permeable solid electrolyte include polyethylene glycol derivatives, polysilicone derivatives (made by Momentive Performance Materials Inc.), polymers comprising sulfonic acid, β-alumina solid electrolytes, NASICON-type solid electrolytes, solid electrolytes obtained by calcining high-purity lithium sulfide and phosphorus sulfide, and lithium ion-conductive glass ceramics (LICGC)(made by Ohara Inc.). The solid electrolyte is not limited to these as long as lithium ions can permeate therethrough.

Also for the battery using the solid electrolyte as the separator, forms of the above-mentioned air battery stacks and wound-type air battery are possible.

The air battery according to the present embodiment is especially preferably an air secondary battery. The air secondary battery is useful not only in applications as small-sized batteries for electric and electronic devices, but particularly as power sources for driving (running) electric cars, which require large capacities.

Hitherto, preferred embodiments of the air batteries and the air battery stacks according to the present invention have been described, but the present invention is not limited to the above-mentioned structures. For example, in the present embodiment, the shape of the air battery 1 is not especially limited to a rectangular parallelepiped. For example, the shape may be of a disc-form, a cylinder-form or the like.

It is sufficient for the oxygen diffusion membrane 2 that a part of the peripheral edge part 2c thereof be in contact with air and the flow of oxygen be possible, and the arrangement of what portion thereof is brought into contact with the outside air is optional. For example, according to applications such as the installation situation of an air battery stack, it is possible to determine the contact portion of the peripheral edge part 2c of the oxygen diffusion membrane 2 with air, and suitably change the position of the external connection terminal. The outer shape of the oxygen diffusion membrane 2 is not especially limited, either, and may be rectangular, circular or the like.

EXAMPLES

Hereinafter, the invention of the present application will be described in detail by way of Examples and Comparative Examples. The present invention is not limited to these Examples.

Example 1

Air Secondary Battery

A flat plate-form air secondary battery illustrated in FIG. 3(a) was fabricated. This battery was one using a hydrogen-absorbing alloy as a negative electrode. The battery reaction formulae of the battery are as described in the above formulae (5) to (8).

(Fabrication of a Negative Electrode 17)

A hydrogen-absorbing alloy of a negative electrode active material 7 was prepared by the following method. Cobalt, aluminum and manganese were mixed with a misch metal-nickel alloy comprising lanthanum as a main ingredient so as to become a prescribed alloy composition ($MmNi_{0.38}Co_{0.8}Al_{0.3}Mn_{0.3}$: Mm was a misch metal and a mixture of La, Ce, Nd and Pr), heat melted by an arc melting furnace, and thereafter pulverized to make a powder passing through a 200-mesh wire gauze (Standard JIS Z8801-1: (2000)) to thereby manufacture a hydrogen-absorbing alloy. The hydrogen-absorbing alloy was kneaded with a 1.0 wt %-polyvinyl alcohol aqueous solution to make a paste, and thereafter, the paste was applied on a nickel mesh-negative electrode current collector 8 (thickness: 0.1 mm), dried, and pressed so that the thickness of the hydrogen-absorbing alloy part became 0.12 mm. Thereafter, the resultant was cut into 40 mm long×30 mm broad to thereby fabricate a negative electrode 17.

Then, a nickel ribbon terminal for external connection 11 (50 mm long×3 mm broad×0.20 mm thick) was connected to an end part of the negative electrode current collector 8.

(Fabrication of a Separator 6)

As a separator 6, a porous membrane (43 mm long×33 mm broad×0.1 mm thick) made of a hydrophilicized polytetrafluoroethylene was used.

Then, an electrolyte 9 was prepared by the following method. Potassium hydroxide and pure water were mixed so as to become potassium hydroxide:pure water=3:7 in weight ratio; 1 mg of a poly(sodium acrylate) as a gelling agent with respect to 100 mg of the total weight of the mixture was added to the mixture to thereby obtain a gelled aqueous solution as the electrolyte 9. The aqueous solution was impregnated in the separator 6.

(Fabrications of a Positive Electrode for Discharge 13 and a Positive Electrode for Charge 72)

A positive electrode catalyst layer was constituted of an acetylene black as a conductive material, an electrolytic $MnO_2$ as a catalyst for promoting the reduction of oxygen, and a PTFE powder as a binder. The positive electrode catalyst layer 4 of 40 mm long×30 mm broad×0.3 mm thick was formed in the acetylene black:the electrolytic $MnO_2$:the PTFE=10:10:1 in weight ratio. A nickel ribbon terminal for external connection 5 (50 mm long×3 mm broad×0.20 mm thick) was connected to an end part of a stainless steel mesh-positive electrode current collector for discharge 3 (40 mm long×30 mm broad×0.1 mm thick). Then, the positive electrode catalyst layer 4 was brought into contact with the positive electrode current collector for discharge 3, and pressure bonded to thereby obtain a positive electrode for discharge 13.

As a positive electrode for charge 72, a nickel mesh was used: and a nickel ribbon terminal for external connection 73 (50 mm long×3 mm broad×0.20 mm thick) was connected to an end part of a positive electrode current collector for charge 72.

The positive electrode for discharge 13 and the positive electrode for charge 72 having the nickel ribbon terminal 73 were laminated through a separator 71 in the order as illustrated in FIG. 3(*a*).

(Fabrication of an Oxygen Diffusion Membrane 2)

As an oxygen diffusion membrane 2, a propylene porous membrane having continuous pores (made by Japan Vilene Company, Ltd., 60 mm long×30 mm broad×0.1 mm thick, the contact angle with water: 100°) was used, and laminated on the positive electrode for discharge 3.

The negative electrode 17, the separator 6, the laminate of the positive electrode for discharge 13/the separator 71/the positive electrode for charge 72, and the oxygen diffusion membrane 2, which all were fabricated as described above, were laminated in this order, and pressure bonded by a press machine to thereby obtain a laminate 19. Portions excluding the oxygen diffusion membrane 2 of the laminate 19 were covered and impregnated with the electrolyte 9 fabricated as described above to thereby make a power generation body 20'. The power generation body 20' was put in a container 10. At this time, the arrangement was made so that a peripheral edge part 2c of the oxygen diffusion membrane 2 protruded outward from an opening 15 of the container 10. There were provided two protrusion parts, and the protrusion length in an outward direction of the container was made to be 0.5 cm.

The nickel ribbon terminals for charge/discharge 5, 11 and 73 were drawn out of the container 10.

<Evaluation of the Performance of the Air Secondary Battery>

(Charge/Discharge Test)

The air secondary battery fabricated as described above was connected to a charge/discharge tester (made by Toyo System Co., Ltd., product name: TOSCAT-3000U) through the nickel ribbon terminals 11 and 73, and was charged at a CC (constant current) of 30 mA for 5 hours. Then, the connection was altered to the nickel ribbon terminals 5 and 11, and discharging at a CC of 10 mA was carried out, and cut off at an end voltage of 0.5 V. As a result, a discharge capacity of 120 mAh was confirmed.

Example 2

An air secondary battery was fabricated as in Example 1, except for altering the negative electrode active material 7 from the hydrogen-absorbing alloy to zinc. The battery reaction formulae of this battery are as described in the above formulae (1) to (4).

The air secondary battery thus fabricated was charged at a CC of 30 mA for 20 hours; and discharging at a CC of 10 mA was carried out, and cut off at an end voltage of 0.5 V.

The terminals to be connected to the charge/discharge tester were changed by charge and discharge as in Example 1 also in charge/discharge in Example 2 onward.

As a result, a discharge capacity of 485 mAh was confirmed.

Example 3

A water-repellent spray (made by Daikin Industries, Ltd., trade name: Novatech) was sprayed on the same oxygen diffusion membrane 2 as used in Example 1 to fabricate an oxygen diffusion membrane 2 having a super water repellency. The contact angle of the oxygen diffusion membrane 2 against water was 151°. An air secondary battery was fabricated as in Example 1, except for using the oxygen diffusion membrane 2 having a super water repellency.

The air secondary battery thus fabricated was charged at a CC of 30 mA for 5 hours; and discharging at a CC of 10 mA was carried out, and cut off at an end voltage of 0.5 V.

As a result, a discharge capacity of 122 mAh was confirmed.

Example 4

An air secondary battery was fabricated as in Example 1, except for altering the hydrogen-absorbing alloy of the negative electrode active material 7 to (40 mm long×30 mm broad×1.2 mm thick).

The air secondary battery thus fabricated was charged at a CC of 30 mA for 48 hours; and discharging at a CC of 10 mA was carried out, and cut off at an end voltage of 0.5 V.

As a result, a discharge capacity of 1,150 mAh was confirmed.

Comparative Example 1

Figure 9:
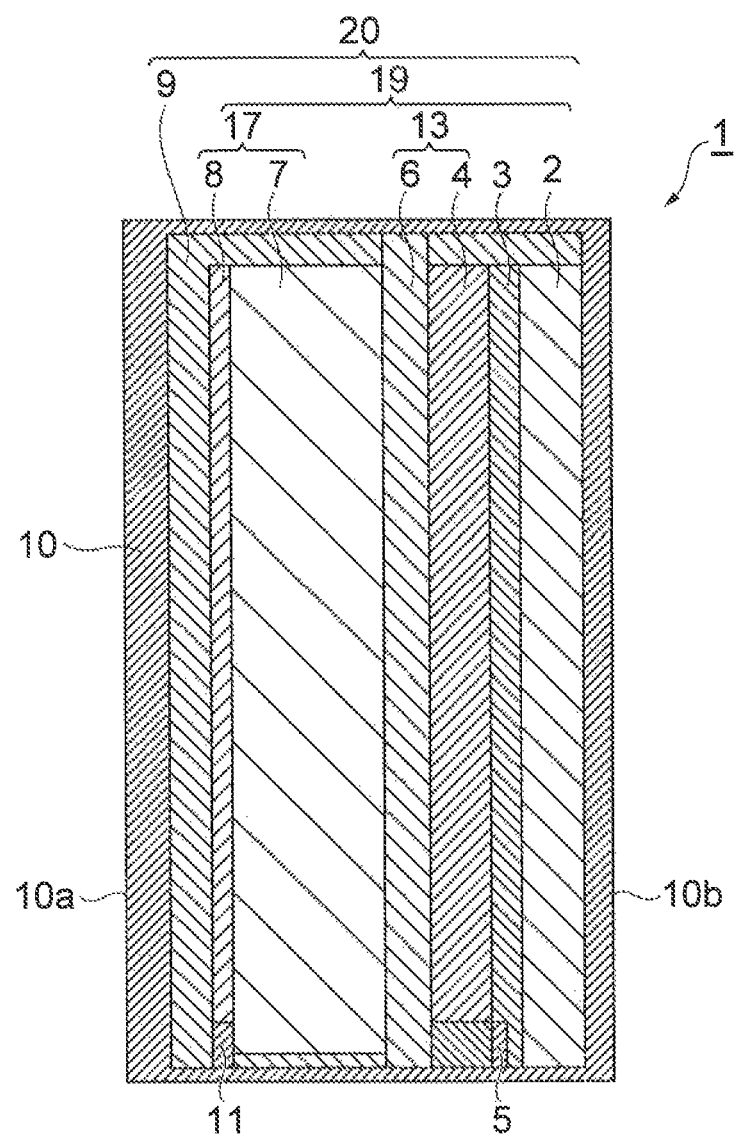
FIG. 9 is a schematic cross-sectional diagram of an air battery of a comparative example.

As illustrated in FIG. 9, an air secondary battery was fabricated as in Example 1, except that no part of the oxygen diffusion membrane 2 is in contact with the atmosphere. As a result, charging was possible, but discharging was only 1 mAh.

(Cycle Test)

Cycle tests were carried out for the batteries of Examples 1 and 3.

The set current for the cycle test was as follows. Charging at a CC of 30 mA was carried out for 5 hours; and discharging at a CC of 10 mA was carried out, and cut off at an end voltage of 0.5 V. This condition was repeated 100 times.

As a result, the capacity maintenance rates after the 100th cycle with respect to 100% for the first cycle were 60% for the battery of Example 1 and 75% for the battery of Example 3.

Example 5

Fabrication of an Air Battery Stack

Four of the power generation bodies 20' (air batteries 1) of Example 1 were laminated, and put in a polypropylene container 10 to fabricate an air battery stack as illustrated in FIG. 5. At this time, the arrangement was made so that a peripheral edge part 2c of an oxygen diffusion membrane 2 protruded outward from an opening 15 of the container 10. There were provided two protrusion parts, and the protrusion length in an outward direction of the container was made to be 0.5 cm.

Four terminals of each of nickel ribbon terminals for charge/discharge 5, 11 and 73, twelve terminals in total, were drawn out of the container 10.

The air secondary battery fabricated as described above was charged at a CC of 120 mA for 5 hours; and discharging at a CC of 40 mA was carried out, and cut off at an end voltage of 0.5 V. As a result, a discharge capacity of 485 mAh was confirmed.

By making a constitution of the present invention in such a manner, it was possible to confirm that stacking of air batteries was easily made.

REFERENCE SIGNS LIST 1, 1' . . . Air battery, 2 . . . Oxygen diffusion membrane, 2c . . . Peripheral edge part, 3 . . . Positive electrode current collector (for discharge), 3' . . . Second positive electrode current collector, 4 . . . Positive electrode catalyst layer, 4' . . . Second catalyst layer, 5, 11, 73 . . . External connection terminal, 6, 71 . . . Separator, 6' . . . Second separator, 7 . . . Negative electrode active material, 8 . . . Negative electrode current collector, 9, 9' . . . Electrolyte, 10 . . . Container, 13 . . . Positive electrode (for discharge), 13' . . . Second positive electrode, 17 . . . Negative electrode, 17' . . . Second negative electrode, 19, 19' . . . Laminate, 20, 20' . . . Power generation body, 72 . . . Positive electrode for charge, 40, 50 . . . Air battery stack, 60 . . . Wound-type air battery, 61 . . . Air hole, 62 . . . Lid, and 63 . . . Container body

The invention claimed is:

1. An air battery comprising a power generation body and a container, the power generation body comprising:
    a laminate in which a negative electrode, a separator, a positive electrode having a catalyst layer and a positive electrode current collector, and an oxygen diffusion membrane are laminated in this order; and
    an electrolyte being in contact with the negative electrode, the separator and the positive electrode,
    wherein one of main surfaces of the oxygen diffusion membrane is arranged facing one of main surfaces of the positive electrode current collector;
    at least a part of a peripheral edge part of the oxygen diffusion membrane is in contact with atmospheric air; and
    the battery satisfies at least one of the following two conditions,
    (1) the power generation body has a solution comprising the electrolyte and a solvent; and a contact angle of the solvent against a surface of the oxygen diffusion membrane is 90° or more, and
    (2) the power generation body has a solution comprising the electrolyte, a solvent and a gelling agent; and wherein a part of a peripheral edge part of the oxygen diffusion membrane protrudes outward through an opening of the container.

2. The air battery according to claim 1, wherein the power generation body has a solution comprising the electrolyte and a solvent; and a contact angle of the solvent against a surface of the oxygen diffusion membrane is 150° or more.

3. The air battery according to claim 1, wherein the negative electrode has a negative electrode active material; and the negative electrode active material is at least one element selected from the group consisting of hydrogen, lithium, sodium, magnesium, aluminum, potassium, calcium, iron and zinc.

4. The air battery according to claim 1, wherein the catalyst layer comprises manganese dioxide or platinum.

5. The air battery according to claim 1, wherein the catalyst layer comprises a perovskite-type mixed oxide represented by $ABO_3$ wherein an A site comprises at least two atoms selected from the group consisting of La, Sr and Ca, and a B site comprises at least one atom selected from the group consisting of Mn, Fe, Cr and Co.

6. The air battery according to claim 1, further comprising a positive electrode for charge.

7. The air battery according to claim 1, being an air secondary battery.

8. The air battery according to claim 1, wherein a second positive electrode having a second catalyst layer and a second positive electrode current collector, a second separator, and a second negative electrode are further arranged in this order on an opposite side of the oxygen diffusion membrane to the side thereof facing the positive electrode.

9. An air battery stack, having two or more of the air batteries according to claim 1, wherein the two or more of the air batteries are mutually laminated in a lamination direction of the laminates.

10. The air battery according to claim 1, wherein the laminate is in sheet form and wound.

11. An air battery comprising a power generation body and a container, the power generation body comprising:
    a laminate in which a negative electrode, a separator, a positive electrode having a catalyst layer and a positive electrode current collector, and an oxygen diffusion membrane are laminated in this order; and
    an electrolyte being in contact with the negative electrode, the separator and the positive electrode,
    wherein one of two opposing main surfaces of the oxygen diffusion membrane is arranged facing one of main surfaces of the positive electrode current collector;
    at least a part of a peripheral edge part of the oxygen diffusion membrane is in contact with atmospheric air; and
    the battery satisfies at least one of the following two conditions,
    (1) the power generation body has a solution comprising the electrolyte and a solvent; and a contact angle of the solvent against a surface of the oxygen diffusion membrane is 90° or more, and
    (2) the power generation body has a solution comprising the electrolyte, a solvent and a gelling agent; and wherein at least one entire side surface other than the main surfaces of the oxygen diffusion membrane is exposed through an opening of the container.

* * * * *